United States Patent

[11] 3,597,608

[72] Inventor: Ernst Gutter, Oberkochen, Germany
[21] Appl. No. 799,349
[22] Filed Feb. 14, 1969
[45] Patented Aug. 3, 1971
[73] Assignee Carl Zeiss-Stiftung d.b.a. Carl Zeiss Heidenheim on the Brenz, Wurttemberg, Germany
[32] Priority Feb. 23, 1968
[33] Austria
[31] A 1737/68

[54] METHOD AND APPARATUS FOR ADJUSTING ELECTRON BEAM IN ELECTRON MICROSCOPE
14 Claims, 5 Drawing Figs.

[52] U.S. Cl. .................................................. 250/49.5 A, 250/49.5 D
[51] Int. Cl. .................................................. H01j 37/26
[50] Field of Search .................................... 250/49.5 A, 49.5 D

[56] References Cited
UNITED STATES PATENTS
2,626,358 1/1953 Meryman ................ 250/49.5
2,856,534 10/1953 Meryman ................ 250/49.5

Primary Examiner—William F. Lindquist
Attorney—Sandoe, Neill, Schottler & Wikstrom ABSTRACT: In an electron beam microscope wherein the beam is laterally adjusted to a desired position, in which it visibly impinges on an image screen, by adjusting the intensity and polarity of the unidirectional magnetic field of each of several electromagnetic deflecting units arranged at different sides of the beam, adjustment of the beam is facilitated by temporarily generating alternating magnetic fields in all but one of said units for laterally wobbling the beam while adjusting the unidirectional magnetic field of the latter unit so that the wobbling beam periodically momentarily assumes its aforesaid adjusted position. Thereafter, alternating magnetic fields are generated in all but one of the remaining unadjusted units which are successively adjusted by means of their unidirectional magnetic fields in the above manner until all but one of the units is adjusted. The unidirectional magnetic field of the latter unit is then adjusted to complete the adjustment of the position of the beam.

METHOD AND APPARATUS FOR ADJUSTING ELECTRON BEAM IN ELECTRON MICROSCOPE

The present invention relates to a method and apparatus for adjusting an electron beam microscope so that the electron beam originating from the cathode passes through the illuminating aperture in correct axial alignment with the optical axis of the objective to impinge, and be visible, on the fluorescent image screen.

In one known design the beam generating system, the illuminating aperture and the objective are movable as means for obtaining the correct relative alignment of the beam. The adjustment of these elements, however, requires a great deal of skill and experience to be able to obtain a final adjustment without altering the relative positions of the elements to an extent which would distort the image produced.

In another known design the correct alignment of the beam is obtained by means of electromagnetic deflecting units mounted between the cathode and the illuminating aperture and adapted for adjustably deflecting the beam laterally along two axes at right angles to each other. For this purpose two of four deflecting units are mounted one above the other at one side of the beam and the other two are mounted one above the other at another side at right angles to the first two units. Each of the units is adapted to generate a unidirectional magnetic field which is variable in intensity and polarity for adjusting and stabilizing the lateral position of the beam in one direction. But adjustment of the lateral position of the beam in this manner is extremely difficult and time-consuming unless the beam is already very close to its correct position since the apertures which the beam must pass through in the image-forming system to visibly impinge on the image screen are quite narrow.

It is a principal object of the present invention to provide an improved method and apparatus which utilizes electromagnetic deflecting units for adjusting the position of the beam, but which supplements the known method and apparatus to enable the correct adjustment to be made simple and quickly, even by inexperienced operators and even if the beam is way out of position.

In accordance with the invention alternating magnetic fields are first generated in three of the four deflecting units to wobble the beam in three directions while the unidirectional magnetic field of the fourth unit is adjusted until the wobbling beam periodically assumes its correct position of alignment at which it momentarily, and visibly, impinges on the image screen. Then while continuing to generate alternating magnetic fields in all but one of the remaining unadjusted units, the latter units are each successively adjusted by means of their adjustable unidirectional magnetic fields to the point at which the wobbling beam again periodically assumes its correct position. When three of the four units have been adjusted in this manner, the usual unidirectional magnetic field is applied in the fourth unit for making the final adjustment of the beam's position.

To assure the periodic movement of the beam to its correct position of adjustment the intensity of the alternating magnetic fields are made such that their peak values at least reach the maximum intensities of the corresponding unidirectional fields which stabilize the beam in its correct position. Also to assure the movement of the wobbling beam to its correct position at frequent intervals, the frequencies of the alternating fields generated in at least two of the units are different, and differences are made sufficient to provide a beat frequency of at least five, and preferably more, cycles.

In one embodiment the frequencies of the alternating magnetic fields generated in the three or four deflecting units are all different. In another embodiment only tow different frequencies are used; the frequencies of the alternating magnetic fields generated in two of the units are the same, but their intensities and polarities are adjustable to different values.

The invention could also be used in combination with designs in which the illuminating apertures and objective are also adjustably movable. For example, the beam might be wobbled in only two directions by providing for the generation of alternating magnetic fields in two deflecting units only, while utilizing mechanical adjustments in the other directions.

Also, as described below, means may be provided for automatically carrying out the adjusting operation of this invention.

The method and apparatus of this invention will now be described in detail below with reference to illustrative embodiments shown in the accompanying drawings in which.

Figure 1:
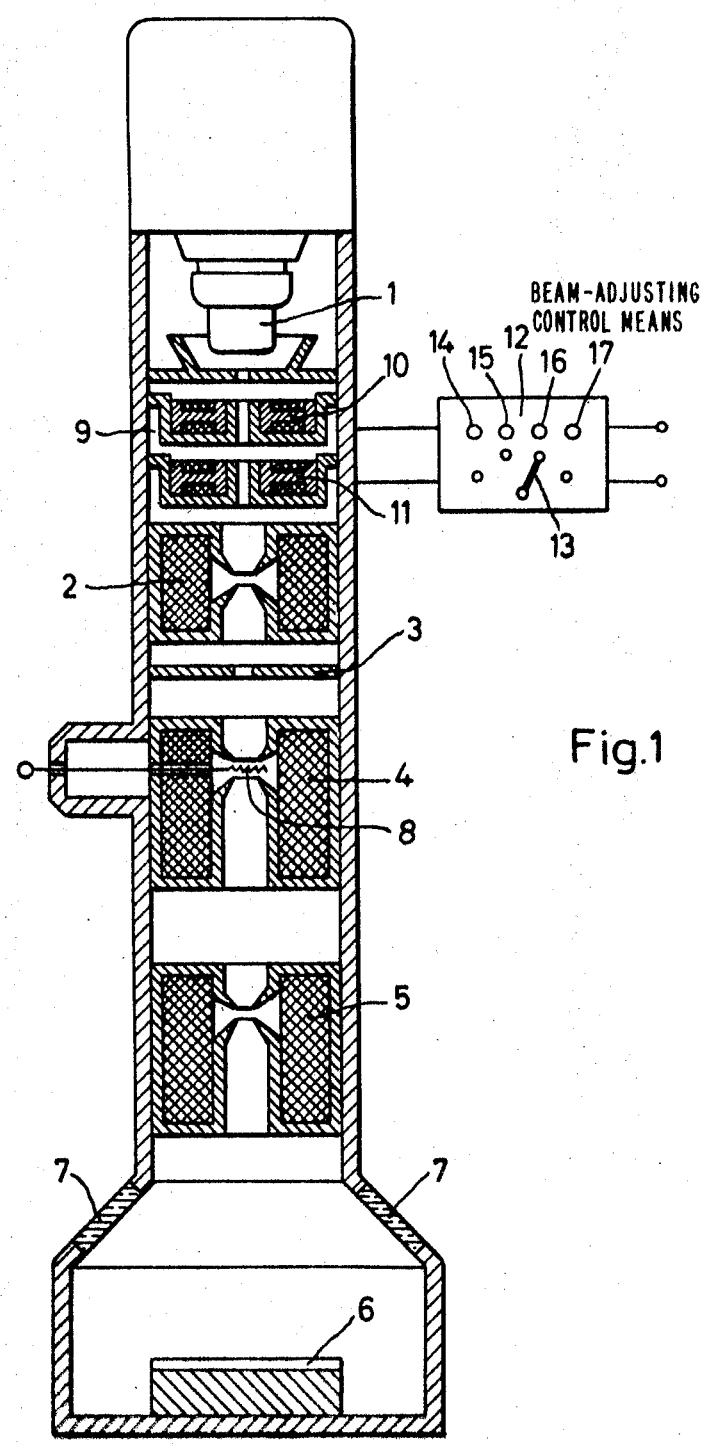
FIG. 1 is a section vertically through an electron beam microscope equipped with apparatus of this invention showing elements of the microscope and apparatus schematically.

Referring to FIG. 1, an electron beam microscope with which the method and apparatus of this invention are adapted to be used has an electron beam gun 1 adapted to direct a beam of electrons respectively through an adjustable condenser 2, through an illuminating aperture 3, and through an objective lens 4 and a projecting lens 5 for projecting onto a fluorescent image screen 6 a magnified image of an object 8 which is supported in the objective lens 4. The magnified image of the object 8 is visible on the screen 6 and is observed through windows 7.

A system; indicated at 9 between the beam gun 1 and illuminating aperture 3, for adjusting the lateral position of the beam consists of four deflecting units, of which two that are designated 10 and 11 are mounted one above the other in the same vertical plane to be at one side of the beam. The other two, which are not visible in the drawing, are mounted one above the other in one vertical plane at right angles to the plane of deflecting units 10 and 11 so as to be at another side of the beam.

Figure 2:
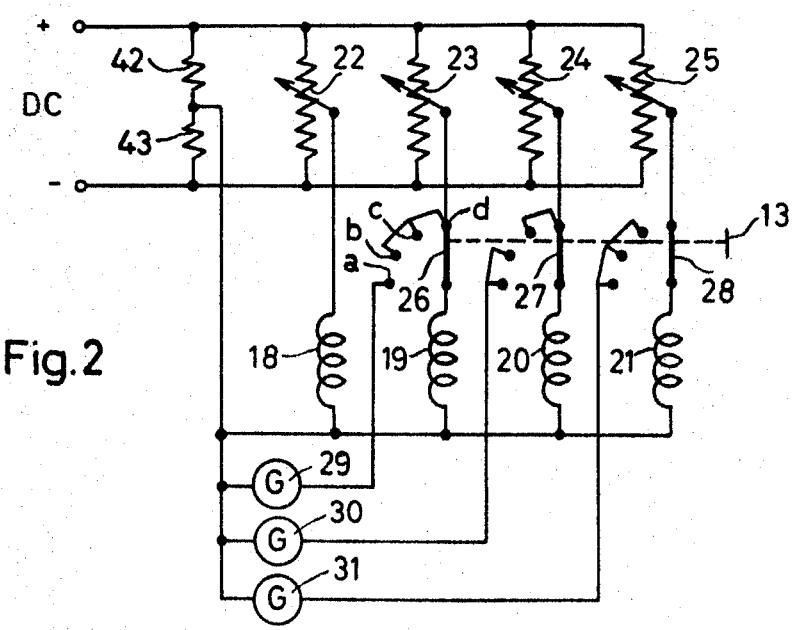
FIG. 2 is a circuit diagram of one embodiment of the invention.

The respective field-coil systems for these four deflection units are designated 18, 19, 20, 21 in connection with the circuit diagram of FIG. 2; it suffices at this juncture merely to state that each deflection unit is adapted for independent excitation to determine the extent and nature of sweep or deflection of the beam along one axis (or degree of freedom) across the screen 6. The two systems 10—11 (e.g., coils 18—19), being one above the other and in the same vertical plane, provide independent means of X-axis deflection, and the two remaining systems of coils 20—21 provide independent means of Y-axis deflection.

As indicated in FIG. 1, a control panel 12 of apparatus embodying the invention has switch 13 with four switching positions (designated $a$, $b$, $c$, and $d$ in FIGS. 2 and 3) for selectively actuating the generation of unidirectional or alternating magnetic fields in the four deflecting units of the adjusting system 9. Also shown on the control panel 12 are four control knobs 14, 15, 16 and 17 for adjusting the intensity and polarity of unidirectional magnetic fields generated in the deflecting units.

Referring to the circuit diagram of FIG. 2, the four deflecting units of the adjusting system 9 include field coils 18, 19, 20, 21 respectively. In the normal operation of the microscope these coils are excited by direct current conducted to the respective coils through a symmetrical voltage divider 42, 43 and through adjustable potentiometers 22, 23, 24 and 25 whereby the intensity and direction of current through the coils can be varied by moving the sliders of the potentiometers 22, 23, 24 and 25 respectively. The coil 18 is connected directly to the slider of the potentiometer 22, whereas the coils 19, 20 and 21 are connectable to the respective potentiometers 23, 24 and 25 through the three-pole switch 13 which has four switching positions, a, b, c and d. By turning the switch 13 to different switching positions the coils 19, 20 and 21 are selectively disconnected from their direct current supply through the potentiometers 23, 24 and 25 and are connected instead to alternating current generators 29, 30 and 31 respectively.

The frequencies of the generators 29, 30 and 31 are different, the differences being sufficient to produce a beat frequency of preferably greater than 5 cycles, and the peak values of the alternating currents through the coils 19, 20 and 21 must be at least equal to the maximum adjusted direct currents $I_2$, $I_3$ and $I_4$ through the respective coils. For example, with the alternating current peak values equal to or greater than the direct current values $I_2$, $I_3$ and $I_4$, the generators 29, 30 and 31 may be selected to generate frequencies of 50, 1070 and 1000 cycles respectively so that alternating current values, which are at least equal to the corresponding direct current values, would be generated at the beat frequency of 20 cycles.

In operation of the apparatus illustrated in FIGS. 1 and 2, the switch 13 is first turned so that its ganged switch arms 26, 27 and 28 connect with the terminals a to connect all three generators 29, 23 and 31 respectively to the coils 19, 20 and 21. The alternating magnetic fields thus generated by the coils 19, 20 and 21 cause the electron beam to wobble in the directions controlled by the deflecting units of which these three coils are the essential element. On the other hand, the stable unidirectional magnetic field generated by the direct current through coil 18 does not move the beam in the direction controlled by the deflecting unit of which coil 18 is a part except by moving the slider of potentiometer 22. Thus, by adjusting the potentiometer 22 the intensity and polarity of the unidirectional magnetic field of coil 18 is varied to shift the beam in one direction until the wobbling of the beam in the other three directions causes it to periodically assume its correct position of adjustment in which it impinges, visibly, on the screen 6. This indicates that the correct value of current $I_1$, for adjustment of the deflecting unit incorporating the coil 18 has been found.

After the current through coil 18 has thus been adjusted, the switch arms 26, 27 and 28 of switch 13 are switched to the terminal b so that coil 19 is switched to be excited by direct current through potentiometer 23 while the coils 20 and 21 remain connected to receive alternating current from generators 30 and 31. With the current from these two generators alternating at frequencies of 1070 and 1000 cycles, respectively, the alternating current peak values to correspond to the requisite direct current values $I_3$ and $I_4$ are produced at a beat frequency of 70 cycles. Then potentiometer 23 is adjusted to vary the intensity and polarity of direct current through coil 19 until the wobbling of the beam again causes it to periodically assume its correct position of adjustment and thereby indicate the appropriate adjustment of the current value $I_2$ for coil 19.

Next the current value for coil 20 is adjusted to its appropriate value $I_3$ by moving the switch arms 26, 27 and 28 to contact c, in which alternating current is only directed through coil 21. Then, as above, the potentiometer 24 is adjusted to vary the value of direct current through coil 20 until the appropriate value $I_3$ is indicated by the periodic movement of the beam to its correct position.

For the last step, switch arms 26, 27 and 28 are moved to contact d so that no alternating current flows through any of the coils. The potentiometer 25 is then adjusted to vary the direct current through coil 21 until the beam is moved into its correct position, when the appropriate current value $I_4$ for the coil 21 is reached.

Figure 3:
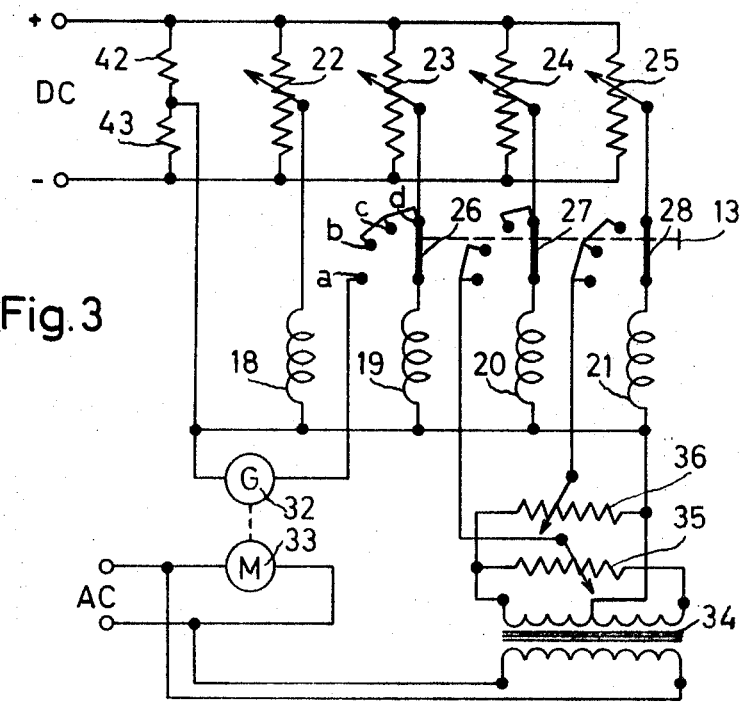
FIG. 3 is a circuit diagram for another embodiment of the invention.

FIG. 3 illustrates an alternative circuit configuration for another embodiment of the invention. In this embodiment the terminal a associated with the arm 26 of switch 13 connects the coil 19 to a generator 32 which, together with a motor 33, constitute a motor-generator combination. The motor 33 and generator 32 are small synchronous machines, each with a different number of pole pairs. For example, a motor 33 may have eight pole pairs, whereas generator 32 may have 10. Thus, if motor 33 is connected to an alternating current source of 50-cycle frequency, the generator 32 will generate an alternating current at 62.5 cycles.

As shown, the source of alternating current for the motor 33 is also connected to the primary winding of a transformer 34, the secondary winding of which has a central tap. A potentiomer 35 is connected in parallel with the entire secondary winding of transformer 35 while a potentiometer 36 is connected in parallel with half of it. The switch arm 27 and its associated contacts a and b are adapted to connect the coil 20 through potentiometer 35 to secondary coil of transformer 34; switch arm 28 and its associated contacts a, b and c are adapted to connect coil 21 to said secondary coil through potentiometer 36. With this configuration alternating current from the source for motor 33 is adapted to be directed through the coils 20 and 21 by the potentiometers 35 and 36 by which the intensity and direction of the alternating current can be varied to provide these coils with alternating current having peak values corresponding to the appropriate direct current values $I_3$ and $I_4$ for these coils.

The embodiment shown in FIG. 3 is operated for adjusting the position of the beam in the same manner as the embodiment illustrated in FIG. 2. In this instance, however, the alternating currents for the three coils, 19, 20 and 21, are only at two different frequencies, the frequency of the current for both coils 20 and 21 being the same (50 cycles, for example). The frequency of the current for coil 19 is different (62.5 cycles, for example). The desired difference in the amount of wobbling of the beam produced respectively by alternating current through both coils 20 and 21 at the same frequency is produced by giving the respective currents different intensities and directions by means of the potentiometers 35 and 36.

Figure 4:
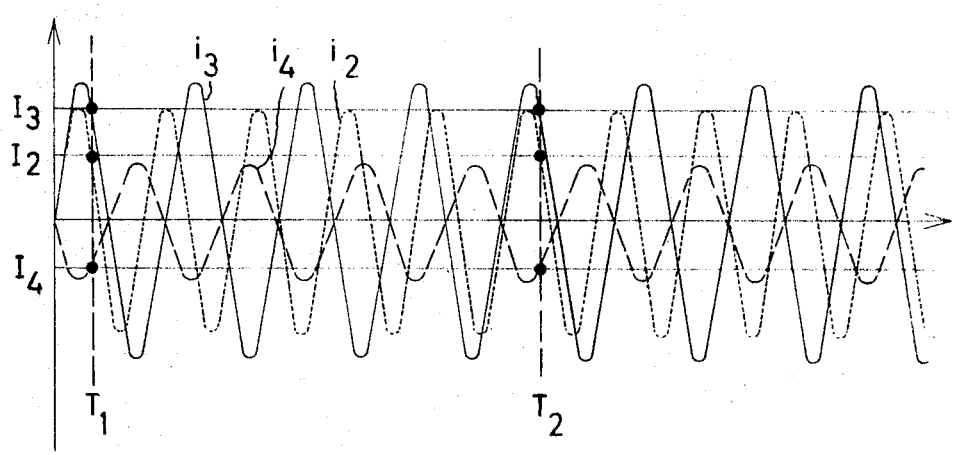
FIG. 4 is a graph illustrating the time course of the alternating magnetic fields generated in the circuit of FIG. 3.

FIG. 4 is a graph showing the time course of the alternating currents $i_2$, $i_3$ and $i_4$ flowing through the coils 19, 20 and 21 of the embodiment illustrated in FIG. 3 when the switch 13 is in the position with its ganged switch arms 26, 27 and 28 on the contacts a. Note that the alternating currents $i_3$ and $i_4$ are at the same frequency but have different values. This graph illustrates the current values $I_2$, $I_3$ and $I_4$ at which the coils 19, 20 and 21 generate magnetic fields of appropriate values and directions for holding the beam in correct position in the respective directions controlled by these coils and, as shown, the alternating currents $i_2$, $i_3$ and $i_4$ reach corresponding values simultaneously at points of time $T_1$ and $T_2$. At these points the beam will be at its correct position of adjustment if the direct current through coil 18 has the value $I_1$ at which it is properly adjusted. With the alternating current $i_2$ at a frequency of 62.5 cycles and the alternating currents $i_3$ and $i_4$ at a frequency of 50 cycles the three alternating currents reach the current values $I_2$, $I_3$ and $I_4$ simultaneously at a beat frequency of 12.5 cycles.

Figure 5:
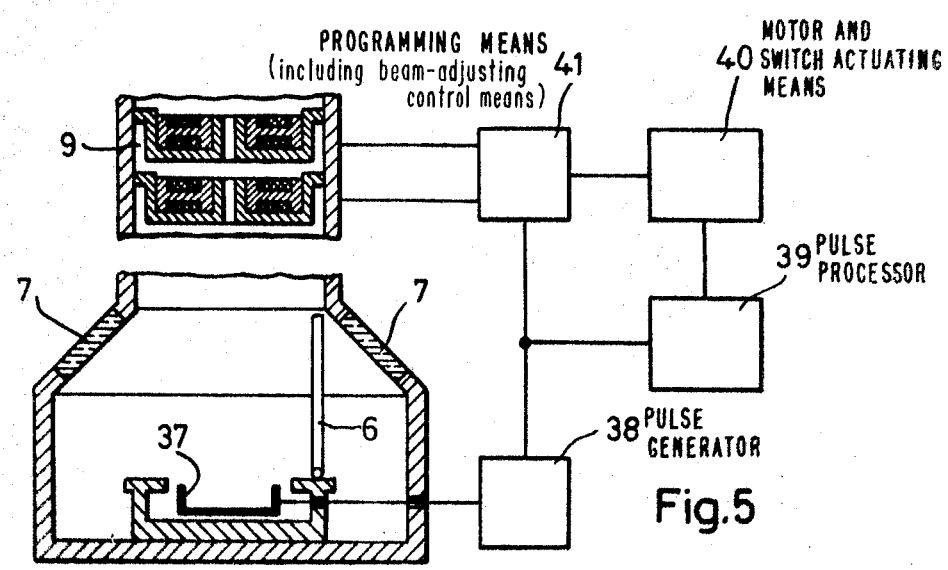
FIG. 5 is a schematic illustration of apparatus for automatically carrying out the adjusting operation of the invention.

FIG. 5 illustrates schematically supplementary apparatus for operating the embodiments of FIGS. 2 and 3 automatically. For this purpose a collector electrode 37 for sensing the electron beam is placed in the position of the image screen 6. The screen 6 may be hinged to be swung up out of the way to expose the collector electrode 37 below it, as shown, or a small central area of the screen 6 may be insulated from the rest of the screen to provide the electrode.

The collector electrode 37 is connected to a pulsing device 38 which is adapted to generate a pulse when the electron beam impinges on the electrode 37 and supply the pulses to another pulse producing device 39 and to a programming device 41 which includes a potentiometer (not shown). When the pulsing device 38 is energized by the beam and sends a pulse to the pulse producing device 39, the latter sends a switching pulse to a switch actuating device 40 for turning a switch, such as the switch 13. At the same time the switch actuating device 40 actuates a motor (not shown) for changing the adjustment of the potentiometer (not shown) in the programming device 41. The various adjustments of the aforesaid potentiometer are in relation to the position of the switch 13, and control the actuation of motors (not shown) for adjusting the potentiometers 22, 23, 24 and 25.

Starting with the switch 13 in position with its arms 23, 24 and 25 on contacts a, the apparatus shown in FIG. 5 operates in a programmed sequence for adjusting the potentiometer 22 until the beam energizes the pulsing device 38. This marks the end of one adjusting step and initiates the next, and so on until the beam is set in adjusted position.

What I claim is:

1. In an electron microscope having a relatively small effective illuminating aperture, the method of adjusting the electron beam to a desired image position using plural independent beam-positioning deflection systems on at least two different deflection axes, each of said deflection systems being normally excited with direct-current energy at an independently adjusted magnitude less than the excitation capacity of the deflection system, said method comprising: first, temporarily wobbling the beam by exciting all but one of the deflection systems with alternating-current energy at peak intensities exceeding said magnitude, at least one of said deflection systems being energized with an excitation frequency differing from that applied to others of said deflection systems to define a beat frequency therebetween, while adjusting the level of direct-current energy to said one deflection system until the beam is periodically aligned with the effective aperture; thereafter repeating the beam-wobbling and adjusting cycle as to remaining unadjusted deflection systems until all but one deflection system is adjusted; and then adjusting the level of direct-current energy to said last-mentioned one deflection system until the beam passes through the effective aperture.

2. The method of claim 1, in which the number of deflection systems is four, and in which the beam-wobbling and deflection-adjusting cycle is repeated three times to accomplish adjustment of the first three deflection systems.

3. The method of claim 1 in which the frequencies of the respective alternating fields are sufficiently different to provide a beat frequency of more than 5 cycles.

4. The method of claim 1 for adjusting an electron microscope having four beam-positioning electromagnetic deflecting systems, wherein alternating-current energy is temporarily supplied to three of said systems; as to which three systems, two are excited at the same frequency but at different intensities and polarities, and the third is excited with alternating-current energy at a different frequency.

5. An electron beam aligning system for an electron microscope comprising an electron gun for generating an electron beam, plural independent deflection systems for selectively positioning said beam about associated directions in a beam image plane, each of said deflection systems including means for displacing said beam about said associated direction in an amount dependent upon the amplitude of the excitation applied thereto, beam-adjusting control means having separate output connections for energizing said deflection systems, said control means including independently variable means for selectively supplying direct current to an associated one of said deflection systems for fixedly displaying said beam, alternating current supplying means for selectively supplying alternating current, of a peak value sufficient to overcome electron beam misalignment, of at least two different frequencies having a beat frequency therebetween to said deflection systems for variably displacing said beam, and switch means for selectively connecting said deflection systems with said direct current supplying means and said alternating current supplying means.

6. The apparatus of claim 5 in which said alternating-current supply means are adapted to supply alternating current at least at two different frequencies and in which said switch means are adapted for connecting one deflection system for excitation at one of said frequencies and for connecting at least one of the other deflection systems for excitation at a different frequency.

7. The apparatus of claim 6 in which the differences in said frequencies are sufficient to provide a beat frequency of at least 5 cycles.

8. The apparatus of claim 5, in which said alternating current supply means are adapted to supply alternating current at different frequencies to all last-mentioned deflection systems.

9. The apparatus of claim 5, in which said control means is adapted for supply by a direct-current source and in which said alternating-current supply means includes generators of different alternating-current frequencies operated by the direct-current source.

10. The apparatus of claim 5, in which the number of deflection systems is four.

11. The apparatus of claim 10, in which two of said deflection systems are positioned for beam deflection on a first axis and the other two deflection systems are positioned for beam deflection on a second axis, orthogonally related to said first axis.

12. The apparatus of claim 10, in which said switch means is a single switch having plural positions, said switch in a first position connecting a first of said deflection systems to its selectively variable direct-current supply while connecting the other three deflection systems to their respective alternating-current supply means, said switch in a second position connecting said first and a second of said deflection systems to their respective selectively variable direct-current supplies while connecting the other two deflection systems to their respective alternating-current supply means, said switch in a third position connecting said first and second and a third of said deflection systems to their respective selectively variable direct-current supplies while connecting the last one of said deflection systems to its alternating-current supply means, and said switch in a fourth position connecting all said deflection systems to their respective selectively variable direct-current supplies.

13. The apparatus of claim 12, in which said respective alternating-current supply means provide at least two different frequencies to said deflection systems.

14. The apparatus of claim 13, in which said microscope includes beam-collecting means at substantially the image plane and having an electrical output responsive to electron-beam impingement thereon, and automatic means responsive to an output generated by said beam-collecting means, said automatic means including actuating means connected to step said switch progressively, from its first to the next of its succeeding positions, upon each newly generated output response of said beam-collecting means.